(12) United States Patent
Presnell

(10) Patent No.: US 6,321,481 B1
(45) Date of Patent: Nov. 27, 2001

(54) TRIANGULAR FISHING FLOAT

(76) Inventor: Bobby B. Presnell, 16441 W. Highway 66, Sapulpa, OK (US) 74066

( * ) Notice: Subject to any disclaimer, the term of this patent is extended or adjusted under 35 U.S.C. 154(b) by 0 days.

(21) Appl. No.: 09/457,662

(22) Filed: Dec. 9, 1999

(51) Int. Cl.⁷ ................................................ A01K 93/00
(52) U.S. Cl. ....................................................... 43/4; 43/43.1
(58) Field of Search ............................ 43/4, 43.1, 43.11; 441/81, 131; 446/153, 220, 225, 226

(56) References Cited

U.S. PATENT DOCUMENTS

| | | | |
|---|---|---|---|
| 779,937 | * | 1/1905 | Holt ................................. 43/43.11 |
| 1,175,968 | * | 3/1916 | Meiners ........................... 43/43.11 |
| 1,431,011 | * | 10/1922 | Kratz ................................... 441/81 |
| 2,924,039 | * | 2/1960 | Morton ............................. 43/43.11 |
| 3,216,146 | * | 11/1965 | Johnson et al. ................. 43/43.11 |
| 3,714,731 | * | 2/1973 | Benson ............................. 43/43.11 |
| 3,878,634 | * | 4/1975 | Quimpo .................................. 43/15 |
| 4,090,318 | * | 5/1978 | Webster ........................... 43/43.14 |
| 4,484,405 | * | 11/1984 | Woods .................................. 43/4.5 |
| 4,569,146 | * | 2/1986 | Lowrance et al. ..................... 43/4 |
| 4,571,878 | * | 2/1986 | Nyman ............................. 43/43.11 |
| 4,607,449 | * | 8/1986 | Brachear ........................... 43/43.1 |
| 4,748,764 | * | 6/1988 | Hammons ......................... 43/43.1 |
| 4,825,580 | * | 5/1989 | Gray .................................. 43/43.1 |
| 4,858,369 | * | 8/1989 | Collins .............................. 43/43.1 |
| 4,873,784 | * | 10/1989 | Petron .............................. 43/44.95 |
| 5,033,225 | * | 7/1991 | Waldroop et al. ............... 43/43.11 |
| 5,048,219 | * | 9/1991 | Georgescu .............................. 43/4 |
| 5,161,324 | * | 11/1992 | Dorsey ............................... 43/43.1 |
| 5,167,554 | * | 12/1992 | Tager et al. ......................... 441/131 |
| 5,207,013 | * | 5/1993 | Bartok et al. .......................... 43/4 |
| 5,253,445 | * | 10/1993 | Spoonemore ......................... 43/17 |
| 5,265,369 | * | 11/1993 | Botkins ............................ 43/43.11 |
| 5,507,674 | * | 4/1996 | Yeung ............................... 441/131 |
| 5,860,845 | * | 1/1999 | Goyhrach ........................... 446/220 |
| 6,012,778 | * | 1/2000 | Peterson ............................. 441/131 |
| 6,029,391 | * | 2/2000 | Holley et al. .................... 43/43.11 |
| 6,092,325 | * | 7/2000 | Walker ............................ 43/43.11 |
| 6,119,409 | * | 9/2000 | Makar et al. ........................ 441/81 |

FOREIGN PATENT DOCUMENTS

| 2647826 | * | 3/1978 | (DE) . |
|---|---|---|---|
| 2147781 | * | 5/1985 | (GB) . |

* cited by examiner

*Primary Examiner*—Darren W. Ark
(74) *Attorney, Agent, or Firm*—William S. Dorman

(57) ABSTRACT

A triangular float for "Jug Fishing". The float is formed as an equilateral triangle having three sides and three apices. A fishing line is connected to one apex and carries a weight on its opposite end. Fish hooks are secured to the line with bait on the hooks. When a fish strikes, the downward pull on the line tips the float so that the leg opposite the attachment apex is slightly elevated above the surface of the water to provide a clear indication that a strike has occurred. This same leg serves as a handle for lifting the float and, hence, the fish out of the water.

4 Claims, 3 Drawing Sheets

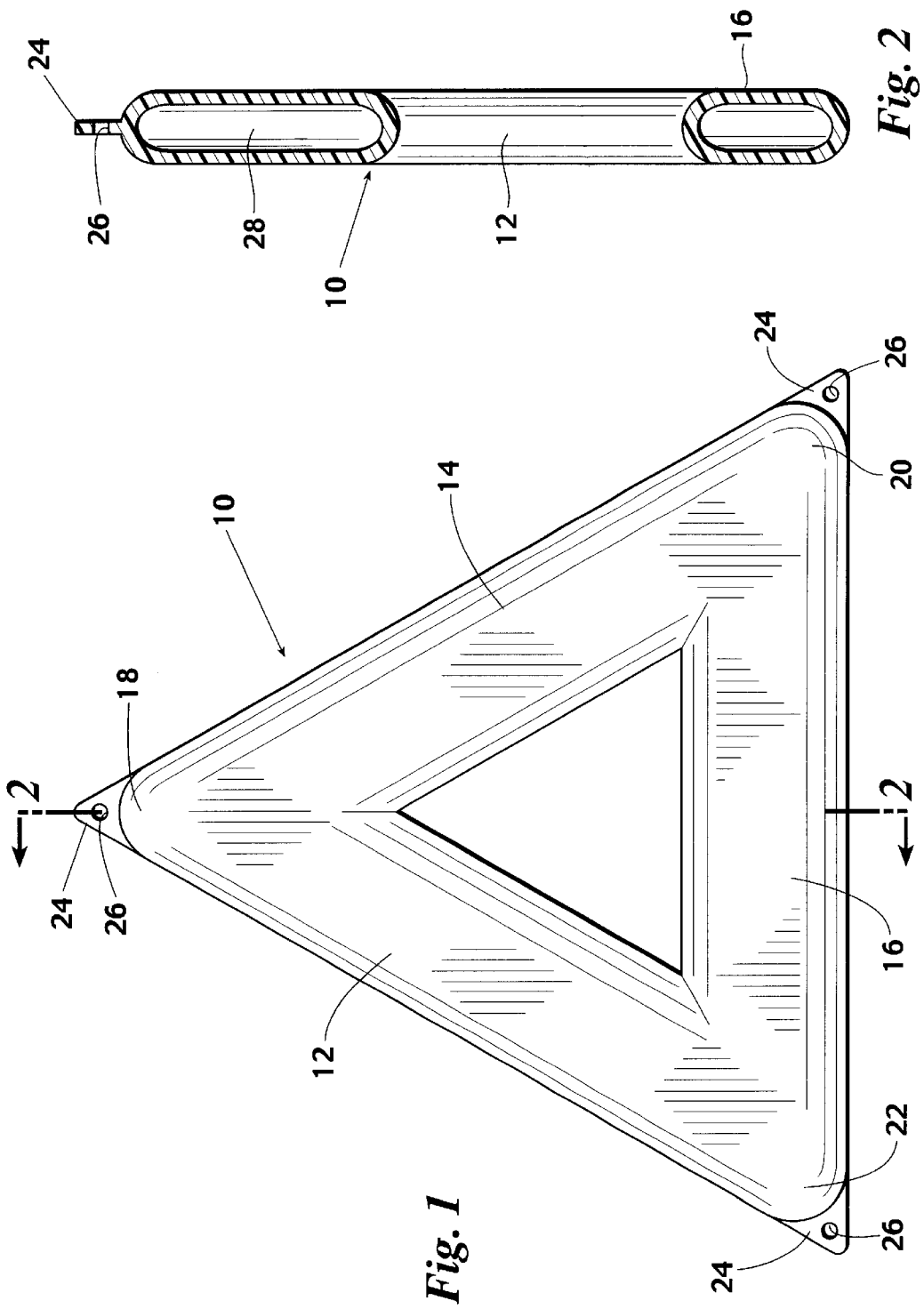

TRIANGULAR FISHING FLOAT

BACKGROUND OF THE INVENTION

1. Field of the Invention

This invention relates to fishing accessories generally, but more particularly, to a triangular float from one of whose apices a fishing line extends and which is constructed to provide a clear visual indication of a strike on the line while, at the same time, providing a readily accessible handle for lifting the float out of the water.

2. Prior Art

A fishing technique which has been popular for some time is commonly referred to as "Jug" fishing. Jug fishing derives its name from the fact that empty plastic bottles or jugs, such as discarded bleach containers, for example, can be used as floats from which fishing lines extend into the water. The fishing line is generally attached to the neck or throat of the bottle or jug and carries a weight on its lower end where one or nor baited hooks are provided. When a fish strikes at the bait, the line will pull on the neck of the bottle and turn it over so as to provide a indication of the strike. A number of difficulties and inconveniences are encountered in traditional jug fishing. The larger plastic jugs occupy considerable space and constitute unattractive clutter on the boat. Discoidal "JUGS" or floats have been provided but they are easily inverted and do not necessarily provide a clear indication of the strike.

A patentability search was conducted on the above invention and the following references are considered pertinent to this invention:

| Inventor | Patent No. | Date |
|---|---|---|
| Hammons | 4,748,764 | Jun. 7, 1988 |
| Collins | 4,858,369 | Aug. 22, 1989 |
| Georgescu | 5,408,219 | Sep. 17, 1991 |
| Spoonemore | 5,253,445 | Oct. 19, 1993 |

With regard to Hammons, although the support appears to be generally triangular in shape, it further appears that this triangular support is almost always in a vertical position and thus, does not operate in the manner of the present invention.

With regard to the Collins patent, this reference shows a float with a handle on it but this does not disclose any of the features of the present invention.

With regard to Georgescu, this patent shows a float which can be used to simulate "Jug" fishing. However, the float is circular or discoidal rather than triangular. FIG. 2 of Georgescu shows a tipping of the discoidal float and FIG. 3 shows that the same has been totally inverted.

The patent of Spoonemore is similar to the patent of Georgescu discussed above, but Spoonemore paints the opposite sides of his disk with contrasting colors so that when the disk is inverted, the fisherman will have a color indication that a strike has occurred.

SUMMARY OF THE INVENTION

The present invention involves a triangular float for use in a type of fishing commonly referred to as "Jug Fishing". Since the float is triangular in shape, it has three apices each of which is provided with a tab. A fishing line is attached to the tab at one apex and may carry a weight on it's lower (opposite) end. One or more fish hooks are secured to the lower end of the line with bait on the hooks. In a modified form of the invention, the float is formed from three buoyant (hollow) legs which connect to each other, thus forming three apices of a triangle. When a fish strikes, the downward pull on the line tips the float so that the portion of the float opposite the attachment apex is slightly elevated above the surface of the water to provide a clear indication that a strike has occurred. This same elevated portion also provides a handle for lifting the float and, hence, the fish out of the water.

BRIEF DESCRIPTION OF THE DRAWINGS

FIG. 1 shows a plan view of one form of the triangular "Jug" fishing device of the present invention.

FIG. 2 is a transverse sectional view taken along section line 2—2 of FIG. 1.

DETAILED DESCRIPTION OF THE PREFERRED EMBODIMENTS

Figures 3, 4:
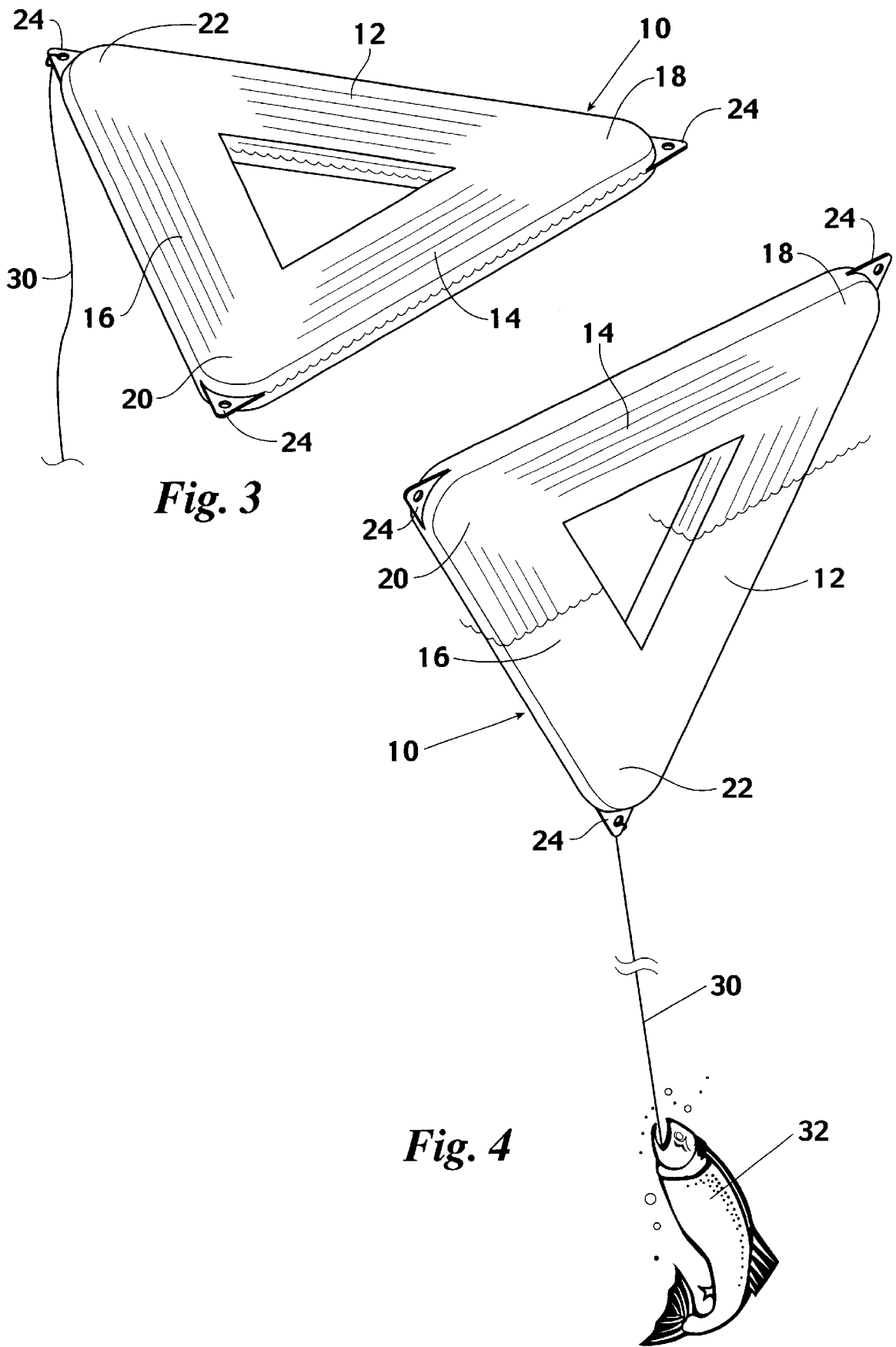
FIG. 3 is a perspective view of the triangular float shown in FIG. 1 showing it resting on the surface of the water with a line hanging down from one apex.
FIG. 4 is a view of the float shown in FIG. 1 showing a fish having taken the bait on the end of the line and showing the side opposite the apex slightly elevated above the water to serve as an indication of the strike and also to provide a handle.

Referring to the drawings in detail, FIG. 1 shows a float 10 which can be used in a method of fishing which is generally referred to as "Jug Fishing". The float 10 comprises three arms 12, 14, and 16 which connect with each other to form a triangle defined by apices 18, 20, and 22. Attached to each apex is a tab 24 having therein a hole 26 for the attachment of a line as will hereinafter appear. The legs are hollow as shown in FIG. 2 so as to make the float 10 floatable. In this regard the space 28 can merely be a closed space or, alternatively, the space 28 can be filled with a floatable plastic material such as (foamed) polystyrene.

Referring now to FIG. 3, the float 10 is shown as resting on the surface of a body of water (indicated by the jagged lines). A fishing line or leader 30 is shown as being tied to a tab 24 which in this particular case is located at the apex 22 which is opposite from the side 14. Of course, the line 30 could be attached to a tab 24 at any apex with the same result because the float is symmetrical. The lower end of the line 30 is preferably provided with a weight (not shown) and furthermore, with a baited hook (not shown).

As shown in FIG. 4, a fish 32 is shown at the end of the line 30. One would have to conclude that the fish 32 swallowed the hook and bait (not shown) which was on the lower end of the line 30 and further, that the weight or pull created by the fish 32 will cause the apex 22 to be pulled down beneath the surface of the water so that the opposite side 14 is exposed and slightly above the surface of the water, under these conditions, a person seeing the side 14 sticking out of the water will know that a strike has occurred and furthermore, the side 14 can be used as a handle so that the fisherman can grasp the handle 14 and remove the float 10 and the fish 32 from the water.

Figure 5:
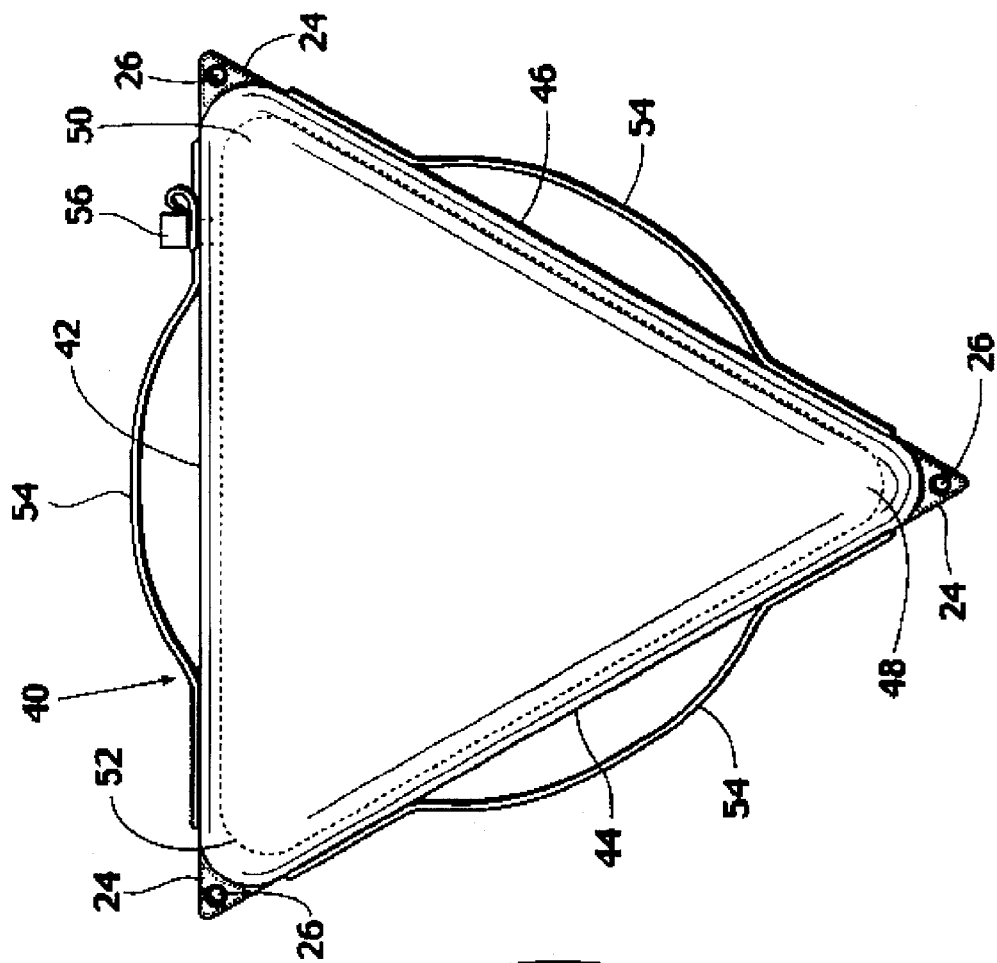
FIG. 5 is plan view of a modified form of the invention where the float is inflatable.
Figure 6:
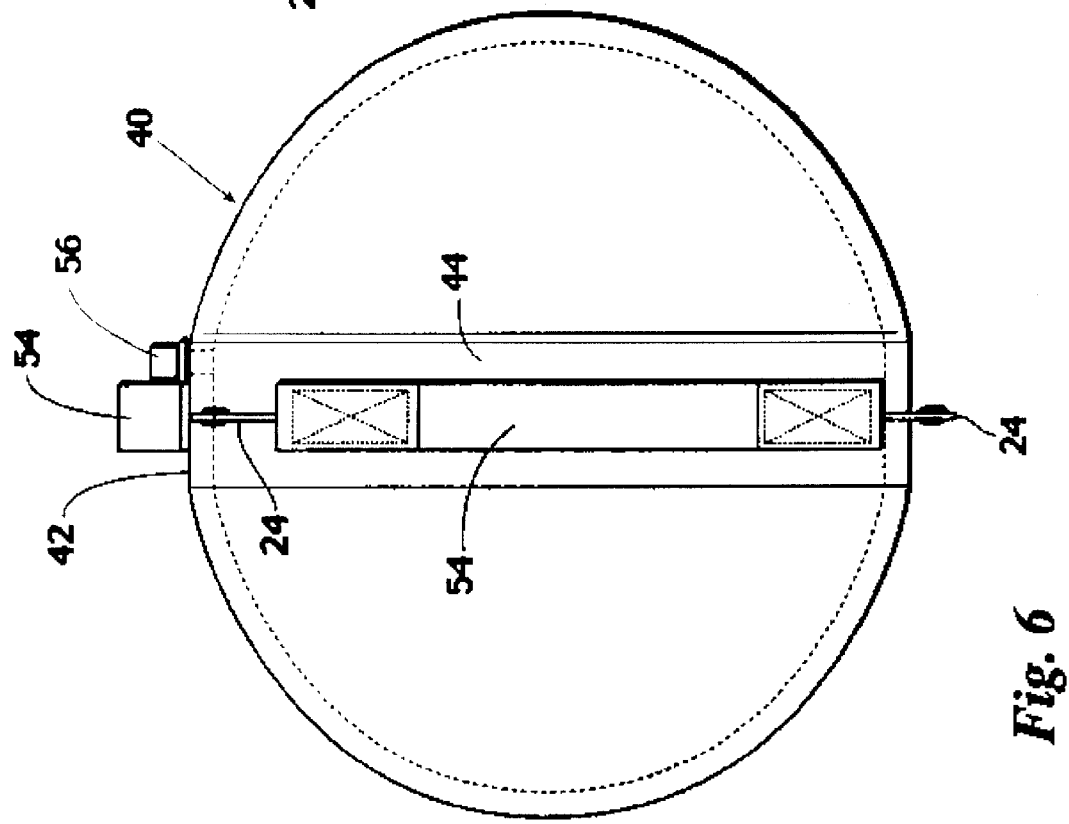
FIG. 6 is a side elevation taken from FIG. 5 showing the float fully inflated.

Referring now to FIGS. 5 and 6, a modified float 40 has three sides 42, 44, and 46 and three apices 48, 50 and 52 opposite from the sides 42, 44 and 46, respectively. Each apex is provided with a tab 24, (just as in the case of FIG. 1) which is provided with a hole 26. Preferably the hole 26 includes a brass eyelet (not shown) which protects the tab 24 from being torn. A fishing line such as the line 30 can be attached to the tab 24 at one of the apices, for example, apex 48, as in the case similar to that shown in FIG. 4.

Instead of being formed from three legs such as the legs 12, 14, and 16 shown in FIG. 1, the float 40 is formed as a single triangular piece, such as a triangular inner-tube, and is preferably covered with nylon (not shown). Each side 42, 44, or 46 is provided with a nylon strap 54 which permits the float to be lifted out of the water. This is distinguished from the modification shown in FIG. 1 where the leg itself serves as a handle. In any case, there is always a side of the float 40 which is opposite from the apex to which the line 30 is attached and the nylon strap on that particular elevated side is used as the handle to lift the float 40 and hence the fish out of the water. The float 40 is preferably provided with an air valve 56 which permits the float 40 to be inflated to any desired degree or, alternatively, when deflated, can be stored flat and take up very small space. The float 10 or 40 is illustrated as free floating, but it can be tethered if desired.

Whereas the present invention has been described in particular relation to the drawings attached hereto, other and further modifications, apart from those shown or suggested herein, may be made within the spirit and scope of this invention.

What is claimed is:

1. A triangular float system for use in jug fishing comprising:

a float having three buoyant legs of substantially equal length and which connect with each other to form an equilateral triangle having three sides and three apices with an open space in the middle, each apex being opposite from a leg, the float being adapted to rest flat on the surface of a body of water;

a fishing line having one end attached to one of said apices and having an opposite end adapted to be disposed beneath the surface of the water;

at least one fish hook being secured to said opposite end of the line with bait thereon so that, when a fish strikes at the baited hook, the downward pull on the line tips the float so that the leg opposite said one of said apices is slightly elevated above the surface of the water to provide a clear indication that a strike has occurred, the elevated opposite leg providing a handle for lifting the float and, hence, the fish out of the water.

2. A triangular float system as set forth in claim 1 wherein the legs are hollow so as to provide buoyancy.

3. A triangular float system as set forth in claim 1 wherein the legs are filled with a buoyant material.

4. A triangular float system as set forth in claim 1 wherein the float is inflatable.

* * * * *